United States Patent
Maehara et al.

(10) Patent No.: US 7,934,483 B2
(45) Date of Patent: May 3, 2011

(54) POSITIONAL ARRANGEMENT OF KNOCK SENSOR ON A MOTORCYCLE ENGINE

(75) Inventors: Hayato Maehara, Saitama (JP); Shinji Saito, Saitama (JP); Kenichiro Nakamura, Saitama (JP); Masaji Narushima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 12/154,698

(22) Filed: May 27, 2008

(65) Prior Publication Data

US 2008/0295577 A1 Dec. 4, 2008

(30) Foreign Application Priority Data

May 31, 2007 (JP) ................................ 2007-144496

(51) Int. Cl.
*F02B 75/22* (2006.01)
(52) U.S. Cl. .................................... 123/195 R; 180/219
(58) Field of Classification Search .............. 123/195 R, 123/198 R; 180/219
See application file for complete search history.

(56) References Cited

FOREIGN PATENT DOCUMENTS

JP 2003-322054 11/2003

*Primary Examiner* — Noah Kamen
(74) *Attorney, Agent, or Firm* — Carrier Blackman & Associates, P.C.; William D. Blackman; Joseph P. Carrier

(57) ABSTRACT

A motorcycle engine includes a crankcase housing a crankshaft, and a transmission unit therein, a cylinder block disposed above the crankcase, a cylinder head disposed above the cylinder block, and an intake system arranged behind the cylinder head, and a knock sensor arranged on an upper surface of the crankcase. The knock sensor is arranged behind the cylinder head, and disposed between the intake system and the cylinder block, such that the knock sensor does not restrict arrangement of additional functional parts of the engine on an upper surface of the crankcase. The knock sensor is substantially surrounded and protected by the intake system, the cylinder head, the cylinder block and the crankcase.

20 Claims, 5 Drawing Sheets

POSITIONAL ARRANGEMENT OF KNOCK SENSOR ON A MOTORCYCLE ENGINE

CROSS-REFERENCE TO RELATED APPLICATIONS

The present application claims priority under 35 USC §119 based on Japanese patent application No. 2007-144496, filed on May 31, 2007. The entire subject matter of this priority document is incorporated by reference herein.

BACKGROUND OF THE INVENTION

1. Field of the Invention

The present invention relates to an arrangement of a knock sensor on an engine, for detecting knocking in the engine on a vehicle, such as a motorcycle. More particularly, the present invention relates to an arrangement of a knock sensor on a motorcycle engine at a rear portion thereof, configured and arranged so that the knock sensor is substantially surrounded and protected by other engine components.

2. Description of the Background Art

There are several known positional arrangements in which a knock sensor is arranged on a cylinder block of an engine. An example of such arrangement of knock sensor is disclosed in the Japanese Patent document JP-A-2003-322054, which discloses a knock sensor mounted on an engine of a four-wheeled vehicle, such as a car. The knock sensor of this reference is generally covered by a hood of the car. Therefore, such arrangement of the knock sensor does not generally require a protective cover to specifically cover the knock sensor.

However, when such a knock sensor is mounted on an engine of a motorcycle, it has conventionally been necessary to provide a separate protective cover for protecting the knock sensor (or the like) since an engine of the motorcycle is exposed to the outside environment, including inclement weather. On conventional motorcycle engines, the knock sensor is generally arranged on a side surface or on a front surface of a cylinder block of the engine. Such a conventional arrangement of the knock sensor typically requires a protective cover for protecting the sensor.

Further, in order to arrange the knock sensor on a rear surface of the cylinder block of the motorcycle engine, it is necessary to impose restrictions on arrangement of other required additional functional parts, such as a starter motor, which are usually mounted on an upper rear surface of a crankcase.

The present invention has been made to overcome such drawbacks. Accordingly, it is one of the objects of the present invention to provide an engine having a knock sensor arranged (disposed) thereon at a location which does not impose significant restriction on the arrangement of additional functional parts, e.g. a starter motor, arranged on an upper rear surface of a crankcase.

SUMMARY OF THE INVENTION

In order to achieve above objects, a first aspect of the present invention provides a motorcycle engine having a knock sensor arranged on a rear portion thereof. The engine includes a crankcase housing a crankshaft and a transmission unit situated behind the crankshaft therein, a cylinder block arranged above the crankcase, a cylinder head arranged above the cylinder block, and an intake system arranged behind the cylinder head. An exposed portion of the knock sensor is arranged behind the cylinder head, so as to be positioned between the intake system and the cylinder block.

In a second aspect of the present invention, in addition to the first aspect, the knock sensor is arranged on the cylinder head with an inclination substantially similar to an inclination of an intake port formed in the cylinder head.

In a third aspect of the present invention, in addition to the first aspect, the knock sensor is arranged proximate a mating surface between a lower portion of the cylinder head and the cylinder block.

In a fourth aspect of the present invention, in addition to the third aspect, the knock sensor includes a mounting member, and the knock sensor including the mounting member is arranged above the mating surface between the cylinder head and the cylinder block.

In a fifth aspect of the present invention, in addition to the one of the third and fourth aspects, the knock sensor is operable to detect seating states of intake and exhaust valves. In a sixth aspect of the present invention, in addition to the one of the third and fourth aspects, the knock sensor is operable to detect a rest state of one or more of a plurality of cylinders in the engine.

ADVANTAGES OF THE INVENTION

According to the invention described in the first aspect, the knock sensor is mounted on the rear portion of the cylinder head so as to be accommodated in a space behind the cylinder head, and arranged between the intake system and the cylinder block. Accordingly, it is possible to keep the knock sensor out of a space behind the cylinder block, whereby it is possible to freely arrange additional functional parts, such as a starter motor, on the upper surface of the crankcase.

Further, the knock sensor is surrounded and protected by the intake system, the cylinder head, the cylinder block and the crankcase.

According to the invention described in the second aspect, the knock sensor is inclined in conformity with an inclination of the intake port. Accordingly, during maintenance, the intake system and the crankcase do not obstruct performing various maintenance operations related to the knock sensor, e.g., mounting of the knock sensor on the cylinder block, and removal thereof from the cylinder block. Thus, such arrangement of the knock sensor facilitates easy maintenance of the knock sensor.

According to the invention described in the third aspect, the mounting position of the knock sensor is arranged close to a source of knock, e.g., the knock sensor is mounted on the cylinder block close to the combustion chamber. Hence, it is possible to enhance signal detection ability of the knock sensor.

According to the invention described in the fourth aspect, the knock sensor, including the mounting member, is arranged above the mating surface between the cylinder head and the cylinder block. Hence, during assembling operation, the cylinder head can be placed on a substantially horizontal surface such as a workbench while mounting the knock sensor on the cylinder head/cylinder block. Therefore, such arrangement of the knock sensor on the rear portion of the cylinder block facilitates an efficient assembling operation of the engine.

According to the invention described in the fifth aspect, the mounting position of the knock sensor is located close to the intake and exhaust valves, and hence, the knock sensor can also easily detect the seating states of the respective valves.

According to the invention described in the sixth aspect, the engine is provided with a valve stop mechanism, and by detecting the seating states of the valves, it is possible to determine whether the cylinder is in a rest state or in an operational state.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
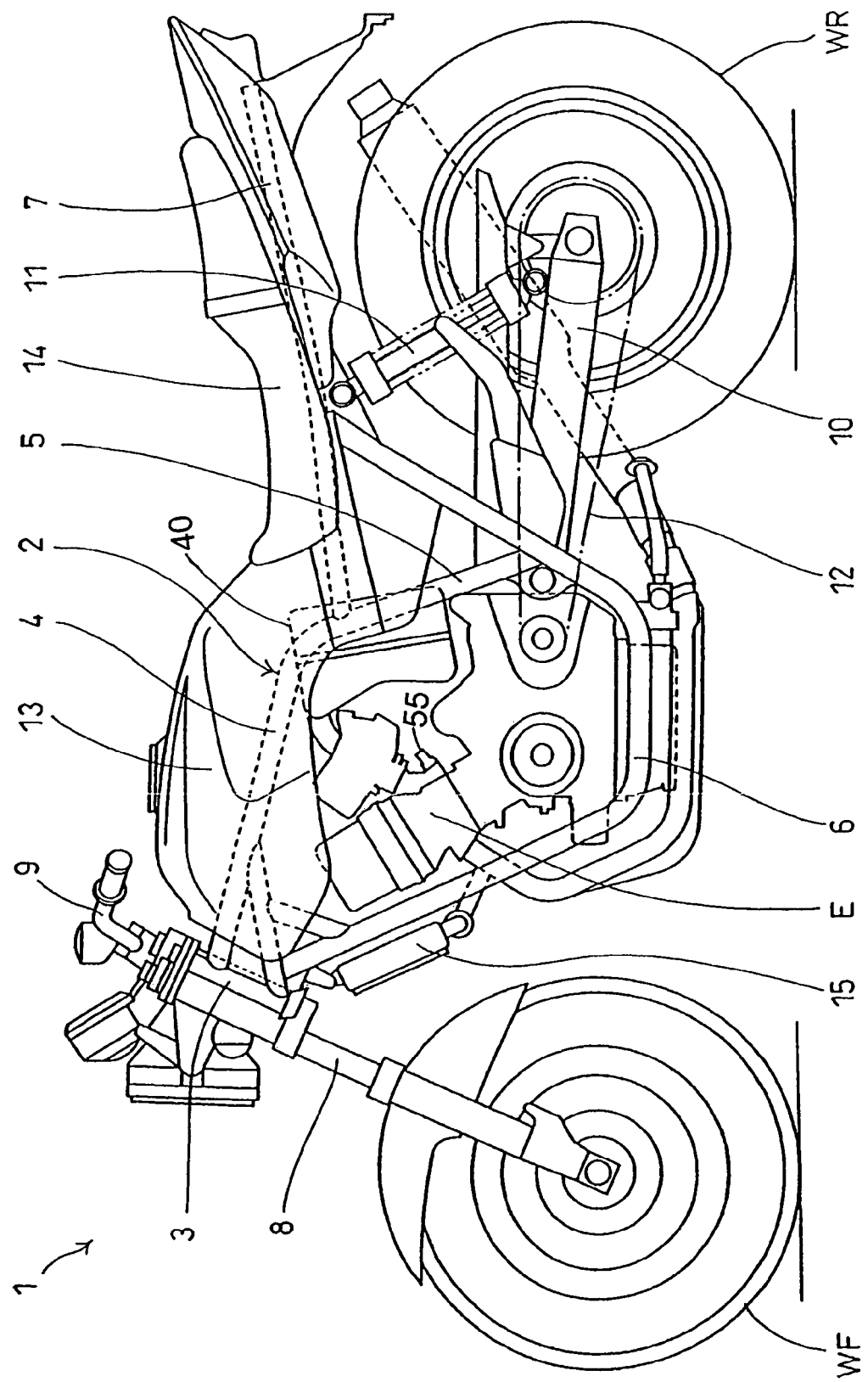
FIG. 1 is a side view of a motorcycle according to an embodiment of the present invention.

FIG. 1 is a side view of a motorcycle 1 according to an illustrative embodiment of the present invention. A vehicle body frame 2 of the motorcycle 1 includes a head pipe 3; main frames 4, 4 extending obliquely in a rearward direction from the head pipe 3; center frames 5, 5 extending downwardly from rear ends of the main frames 4, 4; down pipes 6, 6; and a seat stay 7 extending rearwardly from the main frames 4, 4 and the down pipes 6, 6.

The motorcycle 1 further includes a front fork 8 supporting a front wheel WF steerably supported on the head pipe 3, and a steering handle 9 operatively joined to the front fork 8. Further, a rear fork 10 supporting a rear wheel WR is supported on a rear portion of one of center frames 5, 5 in a vertically rockable manner, and a cushion unit 11 is arranged between the seat stay 7 and the rear fork 10 by using a link mechanism.

The motorcycle 1 includes an engine E supported on the main frames 4, 4 and the center frames 5, 5. The power from the engine E is transmitted to the rear wheel WR via a transmission unit (assembled in the engine E) and a rear wheel driving chain 12. A fuel tank 13 is mounted on the left and right main frames 4, 4 and the left and right center frames 5, 5 such that the fuel tank 13 is arranged above the engine E. A tandem-type seat 14 for a rider and a pillion is mounted on the seat stay 7. A radiator 15 is arranged in front of the engine E.

Figure 2:
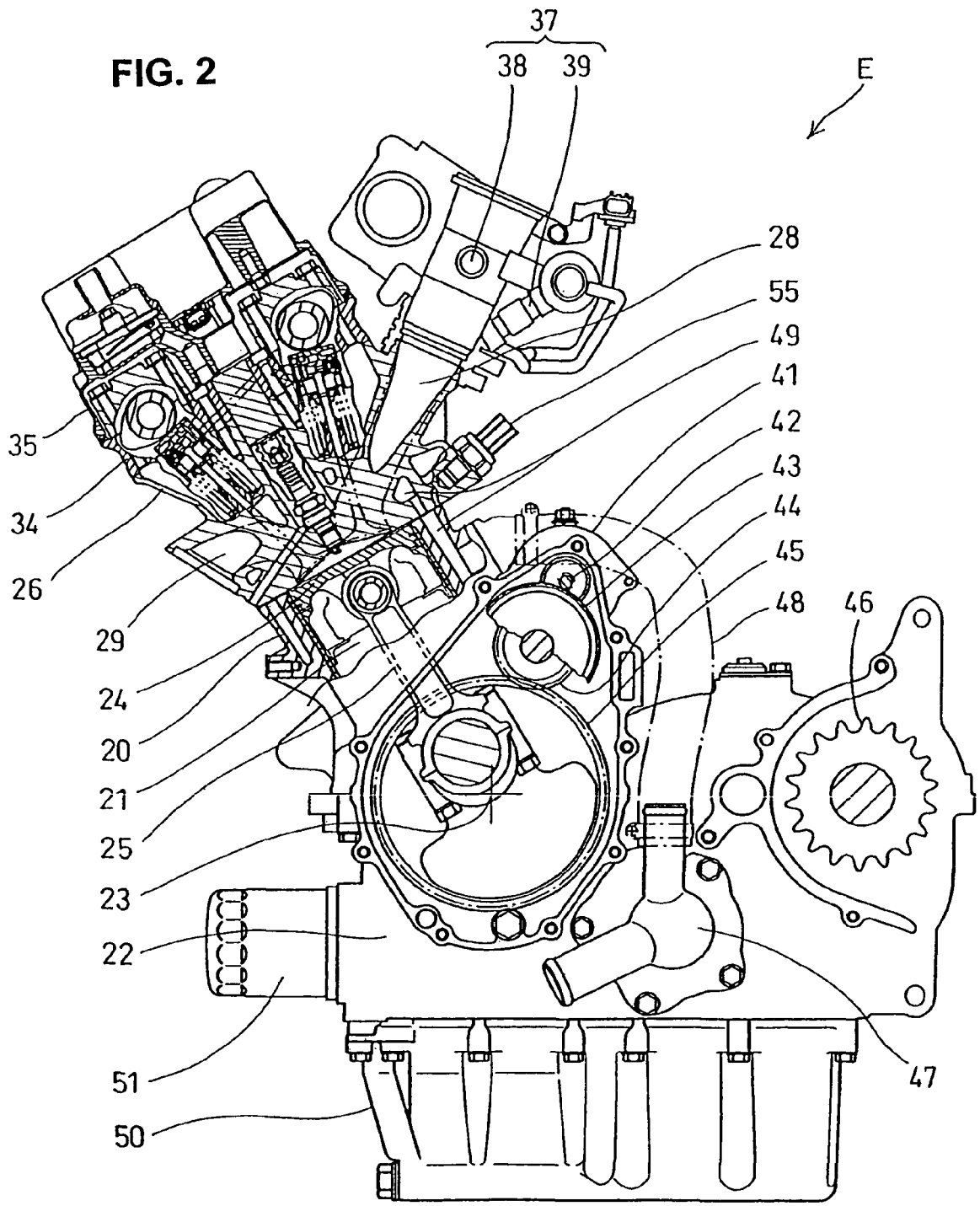
FIG. 2 is a longitudinal cross-sectional view of an engine E of an embodiment of the present invention.
Figure 3:
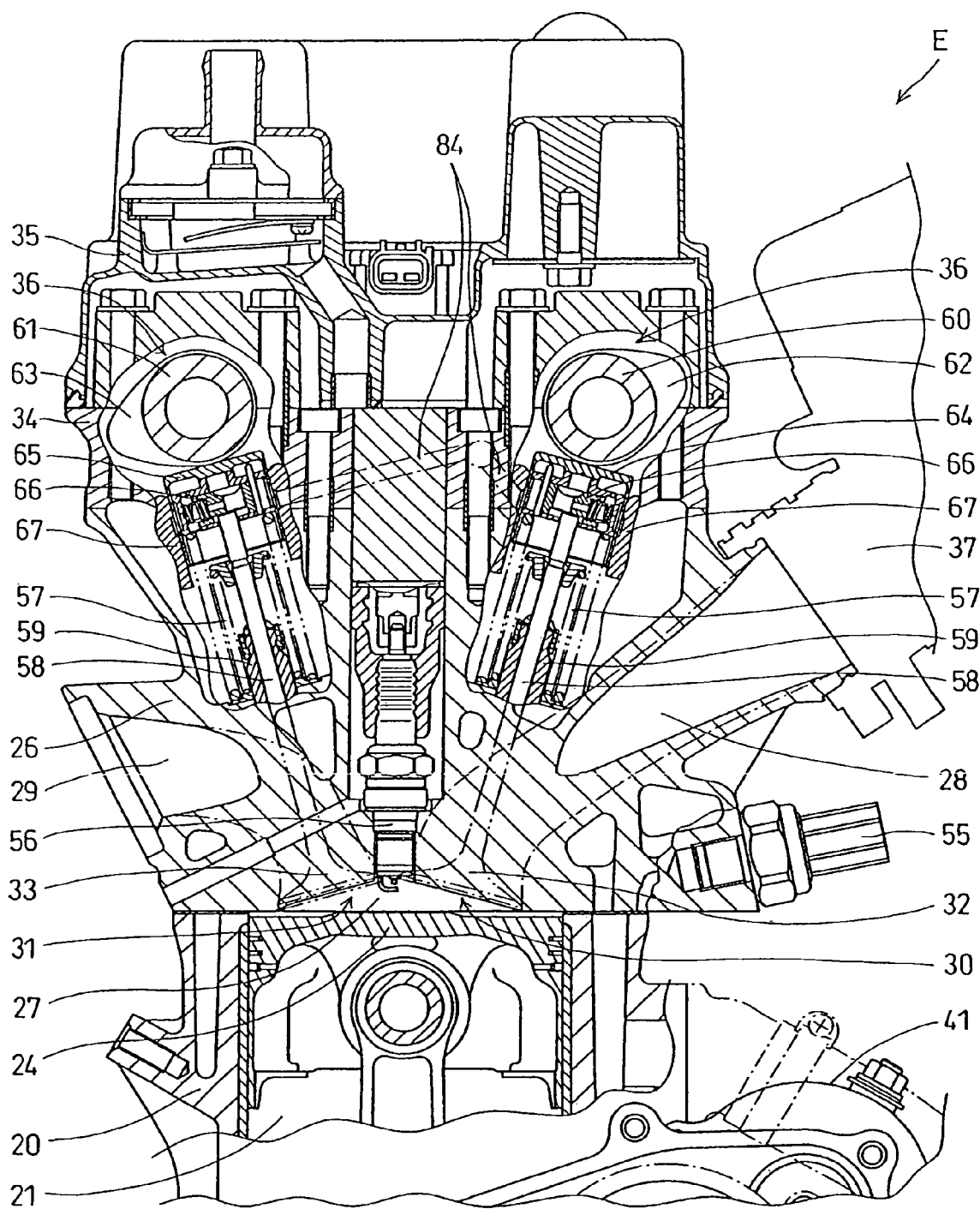
FIG. 3 is an enlarged view of an essential part of the engine E shown in FIG. 2.

FIG. 2 is a longitudinal cross-sectional view of the engine E shown in FIG. 1; and FIG. 3 is an enlarged view of an essential portion of the engine E shown in FIG. 2. The engine E is a 4-cylinder 4-cycle engine. The four cylinders 21 are forwardly inclined in a traveling direction of the vehicle and are arranged in parallel to each other, in a cylinder block 20, in the vehicle-width direction. A crankshaft 23 is arranged in a crankcase 22 in the vehicle-width direction. A piston 24 is slidably fitted in each respective cylinder 21. The piston 24 is connected to the crankshaft 23 via a connecting rod 25.

As shown in FIG. 3, a cylinder head 26 is joined to an upper portion of the cylinder block 20, a recessed portion corresponding to the cylinder 21 is formed in a lower surface of the cylinder head 26, and a combustion chamber 27 is formed between a top portion of the piston 24 and the recessed portion. Intake ports 28 and exhaust ports 29 which are communicably (operatively) connected with the respective combustion chambers 27 are formed in the cylinder head 26. Each intake port 28 is communicably (operatively) connected with each combustion chamber 27 via a pair of intake openings 30, and each exhaust port 29 is communicably connected with each combustion chamber 27 via a pair of exhaust openings 31. An intake valve 32 and an exhaust valve 33 are respectively formed in the intake opening 30 and the exhaust opening 31 for operating, i.e., opening and closing, the intake opening 30 and the exhaust opening 31, respectively.

As shown in FIG. 2, the head cover 35 is joined to an upper portion of the cylinder head 26 via a cylinder head extension member 34. A valve mechanism 36 is positioned between the cylinder head extension member 34 and the head cover 35 (FIG. 3). An intake system 37 is connected to the intake port 28. The intake system 37 mainly includes a throttle valve 38 and a fuel injection device 39, and an air cleaner 40 (shown in FIG. 1) connected to a rear portion of the throttle valve 38.

Further, as shown in FIG. 2, a starter motor 41 is arranged behind the cylinder block 20, and disposed on an upper surface of the crankcase 22. When the engine E is operated, i.e., started on, a driving force of the starter motor 41 is transmitted to a driven gear 45 mounted the crankshaft 23, via a pinion 42 mounted on a rotary shaft of the starter motor 41, a first idle gear 43 and a second idle gear 44, to drive the crankshaft 23. The driven gear 45 has a large diameter.

A constant-mesh transmission unit gear (not shown) including a main shaft and a counter shaft is disposed in the crankcase 22. A sprocket wheel 46 is mounted on a shaft end portion of the counter shaft projecting outwardly from the crankcase. The rear wheel driving chain 12 (shown in FIG. 1) is meshed with the sprocket wheel 46.

A water pump 47, driven by the main shaft via a chain, is mounted on a side surface of the crankcase 22. The water pump 47 is configured to supply cooling water to water jackets 49 of the cylinder block 20 and the cylinder head 26 via a water hose 48 for providing cooling to the engine. The cooling water, after passing through the water jackets 49, is cooled by the radiator 15 (shown in FIG. 1). Thereafter, cooling water is collected and circulated by the water pump 47.

An oil pan 50 is disposed on a lower portion of the crankcase 22, and an oil filter 51 is disposed on a front portion of the crankcase 22.

As shown in FIGS. 2 and 3, a knocking detection sensor 55 (also referred as a knock sensor 55) is mounted on a rear surface of the cylinder head 26, such that an exposed portion of the knock sensor 55 is arranged between the intake system 37 and the cylinder block 20. With such placement of the knock sensor 55 between the intake system 37 and the cylinder block 20, a space can be ensured behind the cylinder block 20. Accordingly, it is possible to freely arrange the starter motor 41, the water hose 48 and the like, above an upper surface of the crankcase 22.

Further, as shown in FIGS. 2 and 3, the knock sensor 55 is mounted on the cylinder head 26 with an inclination angle substantially similar to an inclination angle of the intake port 28 formed in the cylinder head 26. Such arrangement of the knock sensor facilitates easy mounting or removal of the knock sensor 55 since the intake system 37 and the crankcase 22 do not obstruct these operations of maintenance. Accordingly, it is possible to easily maintain the knock sensor 55.

Furthermore, in the illustrated embodiment as shown in FIGS. 2 and 3, all of the respective parts of the knock sensor 55 are disposed above a mating surface of the cylinder block 20 and the cylinder head 26. Due to such a constitution, the cylinder head 26 can be placed on a substantially horizontal surface of a workbench or the like during mounting of the knock sensor 55 on the cylinder head 26 thus facilitating an easy assembling operation of the engine E.

As shown in FIG. 3, an ignition plug 56 is mounted on a center portion of each combustion chamber 27. The pair of intake valves 32 and the pair of exhaust valves 33 are arranged around the ignition plug 56. A valve stop mechanism 66 is mounted on two of four cylinders 21 which are arranged on left and right ends of the cylinder block 20 disposed in a vehicle-width direction.

The intake valves 32 and the exhaust valves 33 are always biased in a valve closing direction by valve springs 57 mounted in the cylinder head 26. These valves 32, 33 are driven by the valve mechanism 36 so as to open and close the intake openings 30 and the exhaust openings 31, respectively. Valve stems 58 of the intake valves 32 and exhaust valves 33 are respectively slidably fitted in cylindrical valve guides 59 fixed to the cylinder head 26, and hence, the intake valves 32 and the exhaust valves 33 can be reciprocated in the valve opening/closing direction.

The valve mechanism 36 arranged between the cylinder head 26 and the head cover 35 allows the intake valve 32 and the exhaust valve 33 to open and close at a predetermined timing interval in response to a rotational position of the crankshaft 23. The valve mechanism 36 includes an intake cam shaft 60, an exhaust cam shaft 61, an intake cam 62, an exhaust cam 63, an intake valve lifter 64, an exhaust valve lifter 65, and the valve stop mechanism 66 for bringing the intake valve 32 and the exhaust valve 33 into a rest state.

The valve stop mechanism 66 is arranged inside of the respective valve lifters 64, 65 of the pair of intake valves 32 and the pair of exhaust valves 33 of the respective cylinders 21 disposed at left and right ends of the cylinder block 20. The respective valve lifters 64, 65 are slidably fitted in lifter support portions 67 formed in the cylinder head extension member 34, and are supported in the direction of the valve stems 58.

The valve stop mechanism 66 for the intake valves 32, and the valve stop mechanism 66 for the exhaust valves 33 have substantially similar structure. Therefore, for brevity, only the valve stop mechanism 66 for the intake valves 32 is discussed.

The valve stop mechanism 66 is a system for changing over a valve driving force transmitted from the intake cam 62 to the valve lifter 64 between a state in which the valve driving force is transmitted to the intake valve 32 and a state in which the valve driving force is not transmitted to the intake valve 32. The valve stop mechanism 66 is controlled using a working oil in a hydraulic control system.

In other word, the valve stop mechanism 66 does not transmit the reciprocation of the valve lifter 64 to the intake valves 32 at the time of performing low-speed driving or low-load driving thus maintaining the intake valves 32 at a closed state.

Figure 4:
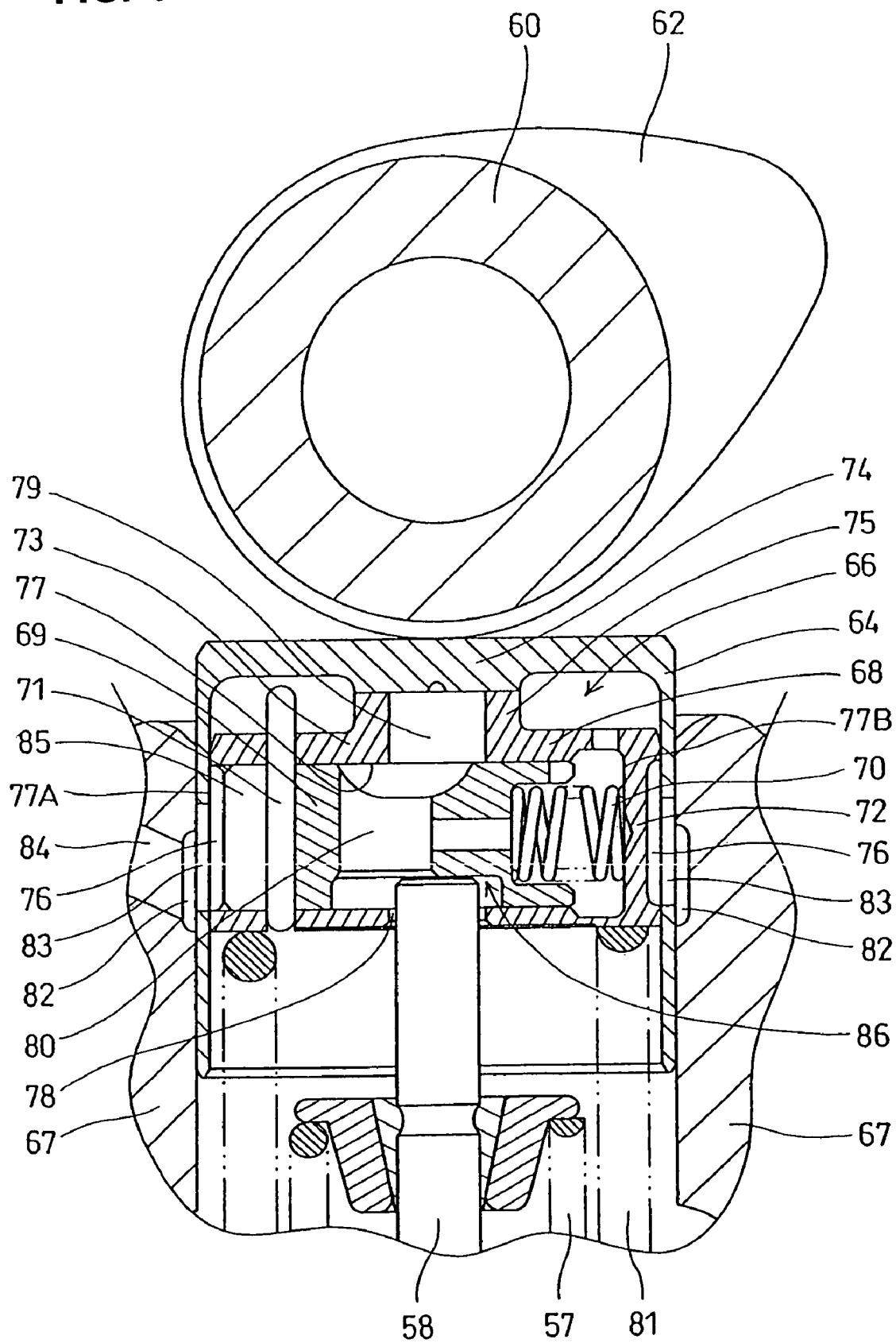
FIG. 4 is an enlarged view around a valve lifter of an intake valve.

FIG. 4 is an enlarged view of the engine portion around the valve lifter 64 of the intake valve 32. The valve stop mechanism 66 includes a cylindrical holder 68 slidably fitted in the valve lifter 64, a slide pin 69 slidably fitted in the holder 68, a coil spring 70 arranged between the holder 68 and the slide pin 69, and a stopper pin 71 mounted on the holder 68. The holder 68 is an integrally formed member including a ring portion 72, a connecting portion 73 joined to the ring portion 72 in a radial direction, and a pushing portion 75 projecting upwardly from the center of the connecting portion 73, for pushing a ceiling wall 74 of the valve lifter 64.

As shown in FIG. 4, an inner annular oil passage 76 is formed in an outer peripheral surface of the ring portion 72 over an entire circumference thereof. A columnar slide pin housing hole 77, having an open end 77A and a close end 77B, is formed in the connecting portion 73 of the holder 68. A lower through hole 78, into which a distal end portion of the valve stem 58 is inserted, is formed in a lower portion of the connecting portion 73, and an upper through hole 79, into which a distal end portion of the valve stem 58 can be inserted, is formed in the pushing portion 75 arranged above the connecting portion 73 coaxially with the lower insertion hole 78 in the axial direction of the valve lifter.

The slide pin 69 is housed in the housing hole 77 in an axially reciprocating manner. A valve stem insertion hole 80 having an axis thereof arranged parallel to an axis of the valve stem 58 is formed in a center portion of the slide pin 69. A support spring 81 arranged to surround the valve spring 57 pushes the holder 68 upwardly and brings the pushing portion 75 into contact with the ceiling wall 74, and urges the valve lifter 64 upwardly so as to bring the ceiling wall 74 into contact with the intake cam 62.

An outer annular oil passage 82 is formed in an inner periphery of the lifter support portion 67, and the inner annular oil passage 76 and the outer annular oil passage 82 are communicably (fluidly) connected with each other via a lifter-side-surface through hole 83 formed in a side surface of the valve lifter. An oil is supplied to the outer annular oil passage 82 from an oil supply passage 84 (see also FIG. 3), so as to apply an oil pressure to the outer annular oil passage 82.

The oil pressure is applied to an oil-pressure chamber 85 formed at an end portion of the slide pin 69 through the lifter-side-surface through hole 83 and the inner annular oil passage 76. The oil pressure is changed over between a low-oil-pressure state and a high-oil-pressure state depending on operation of the valve stop mechanism 66. When a high-oil-pressure is applied to the oil pressure chamber 85, the slide pin 69 is pushed thus compressing the coil spring 70.

FIG. 4 shows a state of an engine operation in which a low-oil-pressure is applied to the oil-pressure chamber 85 formed at the end portion of the slide pin 69. The coil spring 70 is in an extended state where the slide pin 69 is brought into contact with the stopper pin 71, and accordingly, the slide pin 69 is stopped. The support spring 81 brings the pushing portion 75 of the holder 68 into contact with the ceiling wall 74 of the valve lifter 64, and also brings the valve lifter 64 into contact with the cam 60. The valve spring 57 brings a top portion of the valve stem 58 into contact with a contact portion 86 formed on a lower portion of the slide pin 69. When the cam 62 is rotated in such a state, the valve lifter 64 is reciprocated in the vertical direction together with the valve stem 58 thus driving the valve 32 (see FIG. 3). Accordingly, the cylinder 21 is operated due to the operation of the valve 32.

Figure 5:
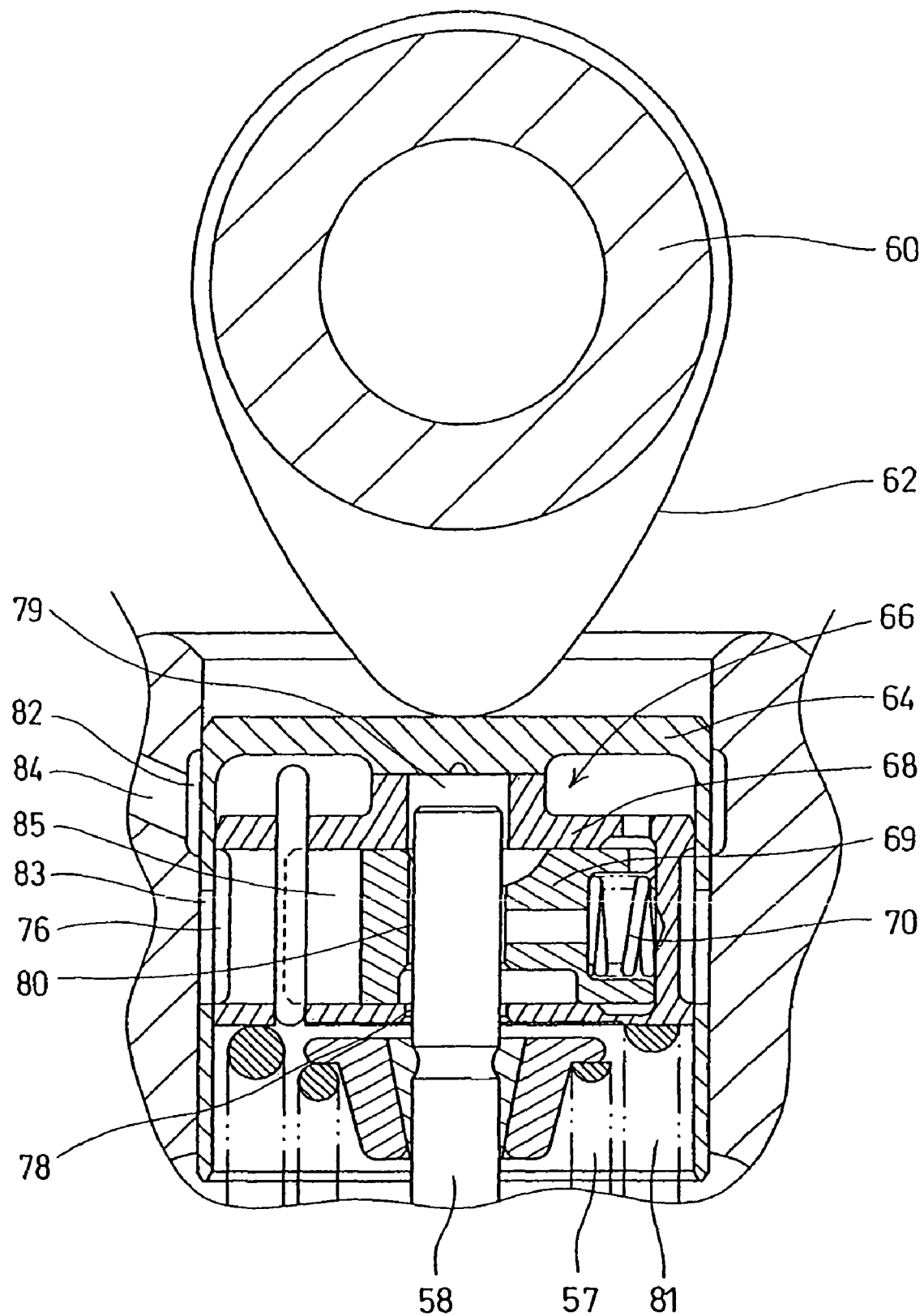
FIG. 5 is a view showing a cam pushing down a valve lifter when a high-oil-pressure is applied to an oil pressure chamber.

FIG. 5 shows a state of an engine operation in which a high-oil-pressure is applied to the oil-pressure chamber 85, and also shows an operational state in which the cam 62 is rotated and pushes down the valve lifter 64. The slide pin 69 is pushed rightwardly against the spring force of the coil spring 70. An axis of the valve stem insertion hole 80 and an axis of the valve stem 58 are aligned with each other. Accordingly, the valve stem 58 can be inserted into the valve stem insertion hole 80 and the upper through hole 79.

The support spring 81 pushes the holder 68 and the slide pin 69 together upwardly thus bringing the valve lifter 64 into contact with the cam 62. The valve spring 57 pushes the valve stem 58 upwardly. When the cam 62 is rotated in such an operational state, the valve lifter 64 and the holder 68 and the slide pin 69 are operated together in the vertical direction. However, the distal end of the valve stem 58 is in a free state inside the lower through hole 78, the valve stem insertion hole 80 and the upper through hole 79. Accordingly, even when the valve lifter 64 is moved, the valve 32 maintains the closed state and is not moved. This indicates that the cylinder 21 is in a rest state due to stopping of the valve 32.

Here, further details of the valve stop mechanism are disclosed in the Japanese patent application JP-A-2006-244085, which was filed prior to this present application by applicant.

As shown in FIG. 3, the knock sensor 55 is mounted on the lower portion of the cylinder head 26 in a vicinity of the mating surface between the cylinder head 26 and the cylinder block 20. Since the knock sensor 55 is located close to the combustion chamber 27, the knock sensor can efficiently exhibit high knock detection ability. Further, the knock sensor 55 is also arranged close to the intake and exhaust valves. Hence, the knock sensor 55 can efficiently detect seating states of the respective valves. In the engine provided with the valve stop mechanism 66, by detecting the seating states of the valves, it is possible to determine whether the cylinder is in a rest state or in an operational state.

ADVANTAGES OF THE PRESENT INVENTION

The knock sensor is mounted on the rear portion of the cylinder head so as to be accommodated in a space behind the cylinder head, and disposed between the intake system and the cylinder block. Hence, it is possible to ensure a space behind the cylinder block whereby it is possible to freely arrange (dispose) the functional parts, such as a starter motor, on the upper surface of the crankcase.

Further, the knock sensor is surrounded and protected by the intake system, the cylinder head, the cylinder block, and the crankcase. Accordingly, additional protection measures are not required for protecting the knock sensor.

Furthermore, the knock sensor does not occupy the rear surface of the cylinder block. Hence, it is possible to realize a desired, "triangular arrangement" for shortening a length of the engine, in which the main shaft is disposed above the crankshaft, and the counter shaft is arranged close to the crankshaft. Such triangular arrangement of the main shaft, the crankshaft and the counter shaft shortens a longitudinal dimension of the engine.

According to the present invention, the knock sensor is inclined in conformity with an inclination of the intake port. Hence, the intake system and the crankcase do not obstruct mounting and removing the knock sensor during maintenance operation.

The mounting position of the knock sensor is arranged close to the combustion chamber, and hence, it is possible to enhance the detection ability of the knock sensor.

The respective portions of the knock sensor and the mounting member of the knock sensor are arranged above the mating surface between the cylinder head and the cylinder block. Hence, the cylinder head can be placed on a substantially horizontal surface, such as a workbench, while mounting the knock sensor on the cylinder head, thereby facilitating the assembling operation of the engine.

The mounting position of the knock sensor is arranged close to the intake valve and the exhaust valve. Hence, the knock sensor can also detect the seating states of the respective valves.

When an engine is provided with a valve stop mechanism, by detecting the seating states of the valves, it is possible to determine whether the cylinder is in a rest state or in an operational state.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An arrangement of a knock sensor for a motorcycle engine,
   said engine comprising
      a crankcase;
      a crankshaft disposed in said crankcase;
      a transmission unit disposed rearwardly of the crankshaft in the crankcase;
      a cylinder block arranged above the crankcase;
      a cylinder head arranged above the cylinder block, and
      an intake system arranged rearwardly of the cylinder head;
   wherein
      the knock sensor is arranged on a rear portion of the cylinder head, so as to be positioned between the intake system and the cylinder block.

2. An arrangement of a knock sensor for a motorcycle engine according to claim 1, wherein the cylinder head has an intake port formed therein, and wherein the knock sensor is arranged on the cylinder head with an inclination substantially similar to an inclination of the intake port.

3. An arrangement of a knock sensor for a motorcycle engine according to claim 1, wherein the knock sensor is arranged proximate a mating surface between a lower portion of the cylinder head and the cylinder block.

4. An arrangement of a knock sensor for a motorcycle engine according to claim 3, wherein said knock sensor comprises a mounting member; and wherein the knock sensor, including the mounting member, is arranged above the mating surface between the cylinder head and the cylinder block.

5. An arrangement of a knock sensor for a motorcycle engine according to claim 4, wherein said engine further comprises intake and exhaust valves; and wherein the knock sensor is operable to detect seating states of said intake and exhaust valves.

6. An arrangement of a knock sensor for a motorcycle engine according to claim 4, wherein cylinder block includes at least one cylinder formed therein; and wherein the knock sensor is operable to detect a rest state of at said least one cylinder.

7. An arrangement of a knock sensor according for a motorcycle engine to claim 3, wherein said engine further comprises intake and exhaust valves; and wherein the knock sensor is operable to detect seating states of said intake and exhaust valves.

8. An arrangement of a knock sensor for a motorcycle engine according to claim 3, wherein cylinder block includes at least one cylinder formed therein; and wherein the knock sensor is operable to detect a rest state of said at least one cylinder.

9. A motorcycle engine comprising
   a crankcase;
   a crankshaft disposed in said crankcase;
   a cylinder block disposed above the crankcase; said cylinder block comprising a plurality of cylinders formed therein;
   a cylinder head arranged above the cylinder block, an intake system arranged rearwardly of the cylinder head, and operatively connected to said plurality of cylinders; and a knock sensor arranged on a rear portion of the cylinder head, and disposed between the intake system and the cylinder block;

wherein said knock sensor is substantially surrounded by the intake system, the cylinder head, the cylinder block and the crankcase.

10. A motorcycle engine according to claim 9, wherein said cylinder head has an intake port formed therein; and wherein said knock sensor is arranged on the cylinder head with an inclination substantially similar to an inclination of the intake port.

11. A motorcycle engine according to claim 9, wherein the knock sensor is arranged proximate a mating surface formed between a lower portion of the cylinder head and an upper portion of the cylinder block.

12. A motorcycle engine according to claim 9, wherein said engine further comprises a pair of intake and exhaust valves operatively associated with each one of said plurality of cylinders; and wherein the knock sensor is operable to detect seating states of said intake and exhaust valves.

13. A motorcycle engine according to claim 9, wherein number of said plurality of cylinders is four; wherein the engine further comprises a valve stop mechanism operatively associated with each one of respective cylinders disposed at left and right ends of the cylinder block; and wherein the knock sensor is operable to detect a rest state of intake and exhaust valves of each of said cylinders having said valve stop mechanism operatively associated therewith.

14. A motorcycle comprising an engine, and a knock sensor for detecting knock of the engine,
said engine comprising:
a crankcase;
a cylinder block disposed above the crankcase, and arranged in a vehicle-width direction;
a plurality of cylinders being forwardly inclined in a traveling direction of the vehicle and arranged in parallel to each other in said cylinder block;
a cylinder head joined to an upper portion of the cylinder block; and
an intake system arranged rearwardly of the cylinder head, and operatively connected to said plurality of cylinders; wherein
the knock sensor is arranged on a rear portion of the cylinder head, and is disposed between the intake system and the cylinder block.

15. A motorcycle according to claim 14, wherein said cylinder head has an intake port formed therein; and wherein the knock sensor is disposed on the cylinder head with an inclination substantially similar to an inclination of the intake port.

16. A motorcycle according to claim 14, wherein the knock sensor is arranged in a vicinity of a mating surface between a lower portion of the cylinder head and the upper portion of the cylinder block.

17. A motorcycle according to claim 14, wherein said engine further comprises at least a pair intake and exhaust valves operatively associated with each of said plurality of cylinders; and wherein the knock sensor is operable to detect seating state of said intake and exhaust valves.

18. A motorcycle according to claim 14, wherein said engine further comprises at least a pair intake and exhaust valves operatively associated with each of respective one of said plurality of cylinders; and wherein the knock sensor is operable to detect an operational state of said intake and exhaust valves.

19. A motorcycle according to claim 14, further comprising a starter motor disposed on an upper surface of the crankcase, and arranged behind the cylinder block.

20. A motorcycle according to claim 14, wherein said knock sensor is surrounded and protected by the intake system, the cylinder head, the cylinder block and the crankcase.

* * * * *